3,126,385
1-PHENETHYLAMINO-4-HYDROXYMETHYL-
PIPERAZINE AND RELATED COMPOUNDS
Calvin H. Lovell, Morton Grove, Ill., assignor to G. D. Searle & Co., Chicago, Ill., a corporation of Delaware
No Drawing. Filed Dec. 31, 1962, Ser. No. 248,285
5 Claims. (Cl. 260—268)

The present invention relates to a group of compounds which are substituted 1-amino-4-hydroxyalkyl-piperazines. More particularly, it relates to compounds of the following general formula

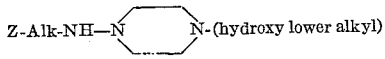

wherein Z is phenyl or cyclohexyl and Alk is a lower alkylene radical. The lower alkylene radicals referred to above separate the Z and amino radicals by at least 2 carbon atoms and contains up to 6 carbon atoms. Thus, Alk can be exemplified by radicals such as ethylene, propylene, trimethylene, butylene, tetramethylene, pentamethylene, and hexamethylene.

The hydroxy lower alkyl radicals referred to in the formula above are lower alkyl radicals which have one hydroxy group as a substituent. These hydroxy lower alkyl radicals contain up to 6 carbon atoms. Examples of the hydroxy lower alkyl radicals are 2-hydroxyethyl, 2-hydroxypropyl, 3-hydroxypropyl, 4-hydroxybutyl, 5-hydroxypentyl, and 6-hydroxyhexyl.

Also encompassed by this invention are the non-toxic salts of the aforementioned organic bases such as the hydrochloride, hydrobromide, hydroiodide, tartrate, succinate, malate, acetate, citrate, ascorbate, nitrate, sulfate, phosphate, and sulfamate.

The compounds of the present invention are conveniently prepared from the appropriate 1-(hydroxyalkyl) piperazines. The piperazine is nitrosated to give the corresponding 4-nitroso compound which is then reduced to the corresponding 4-amino compound. The preferred agent for this reduction is lithium aluminum hydride. The resultant 1-amino-4-hydroxyalkyl compound is then reductively condensed with the appropriate ketone or aldehyde. That is, the aminopiperazine is reacted with the carbonyl compound in a solvent in the presence of a small amount of acid and a hydrogenation catalyst. The resultant mixture is then hydrogenated to give the desired compound.

The compounds of this invention possess valuable pharmacological properties. In particular, these compounds possess interesting central nervous system activity. Thus, the compounds possess stimulant activity which is demonstrated by an increase in bodily activity. In addition, the present compounds are active as appetite-inhibitors and as inhibitors of hepatic cholesterol synthesis. Furthermore, they possess antibiotic activity which is demonstrated by their inhibition of the organism *Chlorella vulgaris*, and they inhibit seed germination as is demonstrated by their inhibition of the germination of seeds of Trifolium.

The compounds which constitute this invention and their preparation will appear more fully from a consideration of the following examples which are given for the purpose of illustration only and are not to be construed as limiting the invention in spirit or in scope. In these examples, quantities are indicated in parts by weight, temperatures in degrees centigrade (° C.), and pressure in atmospheres.

*Example 1*

To a solution of 72 parts of 1-(2-hydroxypropyl) piperazine dissolved in a mixture of 96 parts of concentrated hydrochloric acid and 120 parts of water there is added, with stirring, a solution of 36.4 parts of sodium nitrite in 40 parts of water. 30 minutes later, the solution is neutralized with excess potassium carbonate and potassium hydroxide solutions and the resultant mixture is extracted with methylene chloride. The methylene chloride solution is separated, dried over potassium carbonate, treated with charcoal, and filtered. The solvent is evaporated from the filtrate and the residue is triturated with pentane to give a solid which is recrystallized from hexane containing 10% 2-propanol. The product is 1-(2-hydroxypropyl)-4-nitrosopiperazine melting at about 48–51° C.

A solution of 60.5 parts of 1-(2-hydroxypropyl)-4-nitrosopiperazine in 282 parts of tetrahydrofuran is added, at reflux with stirring, to a suspension of 13.3 parts of lithium aluminum hydride in 1410 parts of tetrahydrofuran. The mixture is refluxed for 7.5 hours and then allowed to stand for 15 hours. It is again heated to reflux and then decomposed by the successive addition of 14 parts of water, 10.5 parts of 20% aqueous sodium hydroxide solution, and 48 parts of water. The mixture is filtered to remove precipitated solids and the solvent is evaporated from the filtrate under reduced pressure. The residue is triturated with ethyl acetate to give a solid which is then recrystallized from ethyl acetate to give 1-amino-4-(2-hydroxypropyl)piperazine melting at about 70–72° C.

In a similar manner, 1-(2-hydroxyethyl)piperazine is nitrosated and then reduced to give 1-amino-4-(2-hydroxyethyl)piperazine, melting at about 103–105° C. Likewise, nitrosation of 1-(3-hydroxypropyl)piperazine and subsequent reduction of the intermediate nitroso compound gives 1-amino-4-(3-hydroxypropyl)piperazine.

*Example 2*

A mixture of 14.5 parts of 1-amino-4-(2-hydroxyethyl)piperazine, 16 parts of phenylacetone, 3 parts of glacial acetic acid, and 0.5 part of platinum oxide in 40 parts of ethanol is hydrogenated at 93.5 atmospheres and at room temperature for 2.5 hours. The mixture is filtered to remove the catalyst and the filtrate is evaporated to dryness under reduced pressure on a steam bath. Water is added to the residue and the mixture is made alkaline with potassium carbonate and potassium hydroxide. The resultant mixture is extracted with ether and the combined ether extracts are, in turn, extracted with excess 1 N hydrochloric acid. The combined acid extracts are washed with ether and alkalized with potassium hydroxide. The resultant oil is extracted into ether and the ether solution is dried over potassium carbonate, and treated with charcoal. The solvent is evaporated from the ether solution and the residue is dissolved in 2-propanol and added to a solution of excess hydrogen chloride and 2-propanol. The solid which forms is separated and recrystallized from absolute ethanol to give 1-(2-hydroxyethyl)-4-(α - methylphenethylamino)piperazine dihydrochloride melting at about 228–233° C. with decomposition. The free base of this compound has the following formula

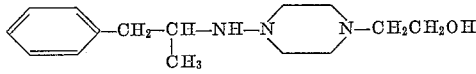

*Example 3*

A mixture of 28.8 parts of a 50% ethanolic solution of phenylacetaldehyde, 15.9 parts of 1-amino-4-(2-hydroxypropyl)piperazine, 6 parts of glacial acetic acid and 0.5 part of platinum oxide in 120 parts of ethanol is hydrogenated for 4 hours at 126 atmospheres and 30° C. The mixture is filtered to remove the catalyst and the filtrate is heated on a steam bath and under reduced pressure to remove the solvent. Water is added to the residue and the mixture is made alkaline by the addition of potassium carbonate and potassium hydroxide, and it is extracted with ether. The combined ether extracts are then extracted with excess 1 N hydrochloric acid and the combined acid extracts are washed with ether and then alkalized with potassium hydroxide solution. The resultant aqueous mixture is extracted with ether and the combined ether extracts are dried over potassium carbonate and treated with charcoal. The solvent is evaporated from the ether solution and the residue is dissolved in 2-propanol and added to a solution of excess hydrogen chloride in 2-propanol. The precipitate which forms is separated and recrystallized from absolute ethanol to give 1-(2-hydroxypropyl)-4-phenethylaminopiperazine dihydrochloride melting at about 220–222° C. with decomposition. The free base of this compound has the following formula

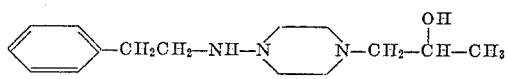

*Example 4*

An equivalent quantity of 1-amino-4-(2-hydroxypropyl)piperazine is substituted for the 1-amino-4-(2-hydroxyethyl)piperazine and the procedure of Example 2 is repeated. The free base is isolated from the reaction mixture, it is purified in the indicated manner and then converted to the dihydrochloride salt. In this case, the product is 1-(2-hydroxypropyl)-4-(α-methylphenethylamino)piperazine dihydrochloride. This compound has the following formula

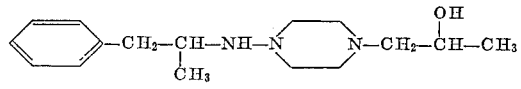

*Example 5*

A mixture of 15.9 parts of 1-amino-4-(3-hydroxypropyl)piperazine, 16 parts of phenylacetone, 3 parts of glacial acetic acid, and 0.5 part of platinum oxide in 40 parts of ethanol is hydrogenated according to the procedure described in Example 2. The product is isolated and purified in the indicated manner to give 1-(3-hydroxypropyl)-4-(α-methylphenethylamino)piperazine dihydrochloride. The free base of this compound has the following formula

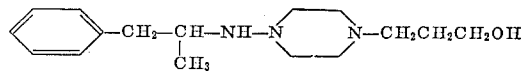

*Example 6*

14.5 parts of 1-amino-4-(2-hydroxyethyl)piperazine, 16.8 parts of cyclohexyl acetone, 6 parts of glacial acetic acid, and 0.5 part of platinum oxide in 120 parts of ethanol is treated with hydrogen at 99 atmospheres and room temperature for a period of 2 hours. The mixture is filtered to remove the catalyst and the solvent is removed from the filtrate at reduced pressure on a steam bath. The residual material is mixed with water and made alkaline by the addition of potassium hydroxide and potassium carbonate. The resultant mixture is extracted with ether and the product is isolated from the mixture according to the procedure described in Example 2. In this case, the free amine solidifies on standing and it is recrystallized from hexane to give 1-(2-hydroxyethyl)-4-(2-cyclohexyl-1-methylethylamino)piperazine melting at about 75–78° C.

What is claimed is:

1. A compound of the formula

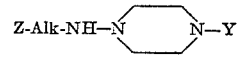

wherein Z is selected from the group consisting of phenyl and cyclohexyl; Alk is lower alkylene separating the groups attached thereto by at least two carbon atoms; Y is hydroxy lower alkyl.

2. A compound of the formula

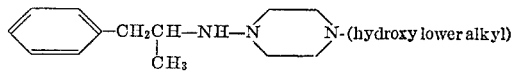

3. 1 - (2 - hydroxyethyl) - 4 - (α - methylphenethylamino)piperazine.

4. 1-(2-hydroxypropyl)-4-phenethylaminopiperazine.

5. 1 - (2 - hydroxyethyl) - 4 - (2 - cyclohexyl - 1-methylethylamino)piperazine.

No references cited.